United States Patent
Sarangapani

[19]

[11] Patent Number: 6,165,366
[45] Date of Patent: Dec. 26, 2000

[54] PROCESS FOR REMOVING MERCURY FROM INDUSTRIAL AND CLINICAL WASTE WATER

[75] Inventor: Shantha Sarangapani, Walpole, Mass.

[73] Assignee: ICET, Inc., Norwood, Mass.

[21] Appl. No.: 09/431,650

[22] Filed: Nov. 1, 1999

[51] Int. Cl.[7] ..................................................... C02F 1/28
[52] U.S. Cl. ..................... 210/666; 210/694; 210/756; 210/759; 210/806; 210/807
[58] Field of Search ................................. 210/756, 759, 210/694, 661, 806, 807, 335, 665, 666

[56] References Cited

U.S. PATENT DOCUMENTS

| | | | |
|---|---|---|---|
| 3,974,170 | 8/1976 | Campbell et al. | 260/306 |
| 5,755,977 | 5/1998 | Gurol et al. | 210/759 |
| 5,868,924 | 2/1999 | Nachtman et al. | 210/85 |

Primary Examiner—David A. Simmons
Assistant Examiner—Chester T. Barry
Attorney, Agent, or Firm—Hale and Dorr LLP

[57] ABSTRACT

A process is described for the removal of mercury present at levels of 1–5000 ppb in waste water discharged from clinical research laboratories, industries and hospitals. The process involves preoxidation of the influent waste water with very small amounts of hypochlorite (16–100 ppm levels)or hydrogen peroxide, in a pretreatment tank. The waste water is then serially filtered through two pre filters and four carbon columns at a flow rate of 5 bedvolumes/hr. The preoxidation, prefiltration, organic removal, heavy metals removal (second column) and polishing stages (third and fourth) are important to achieve very low levels of mercury in the effluent. The last three columns contain activated coconut shell carbon impregnated with mercaptothiazoline . The three columns of the mercaptothiazoline impregnated carbon remove mercury and other heavy metals successively and reduce their levels in the influent to very low levels that is well below the enforced limit of 1 ppb. The last column could be also filled with MCT impregnated carbon fiber. Each of the columns are topped by a 0.5 foot layer of 0.5% carbon impregnated with chlorhexidine, butyl paraben and resorcinol monoacetate to prevent biofouling.

9 Claims, 6 Drawing Sheets

PROCESS FOR REMOVING MERCURY FROM INDUSTRIAL AND CLINICAL WASTE WATER

BACKGROUND OF THE INVENTION

This invention relates to a method for removal of trace mercury from industrial waste water and more particularly to a process for removing trace mercury from clinical and hospital waste water.

Waste water produced by hospitals and hospital-related industries originates from many sources. Such waste water is produced by clinical laboratories, research laboratories, medical waste incinerators equipped with fume scrubbers and hospital laundries.

Extremely complex and diverse waste waters are generated from a typical clinical/research laboratory associated with a hospital. They could contain ionic mercury and organic mercuric compounds (Methyl mercury and /or Thimersol an organic mercury compound used as a fixative for tissue specimens), other heavy metals, organic chemicals, blood products, body fluids, formaldehyde, dilute acids/bases, oxidizers, oil, grease, phosphates, detergents, wastes from automated instrumentation, photographic imaging chemicals, radionuclides and particulate matter. In addition they contain a variety of bacterial flora including pathogens from humans. The liquid waste stream from an incinerator scrubber usually has low concentrations of organic material but contains significant concentrations of heavy metals including mercury and particulate matter. Typical mercury concentrations range from 2 ppb to several hundred ppb. Such waste water volumes are anywhere from a few hundred gallons/day to over 50,000 gallons/day depending on the size of the institution. Currently these are discharged without any pretreatment other than pH adjustment.

Several state and federal agencies enforce a limit of 1 $\mu$g/L (ppb) for the mercury in the discharge from these facilities. However compliance has been difficult due to the challenge of treating the mercury for such complex waste waters and the lack of a cost effective and reliable technology. The US Environmental Protection Agency has been focusing increased scrutiny on the impact of mercury discharges into the environment. Mercury is a bio-accumulating toxic, that poses a threat to fish and the food chain, including human beings. It, therefore, may not be discharged to ensure that the quality of the treated affluent and the bio-solids that are converted into fertilizer pellets, meet applicable state and federal regulatory limits.

It is therefore a principal object of the present invention to provide a method for removing mercury from waste water.

It is another object of the present invention to provide a method for removing mercury from waste water in a reliable and cost effective manner.

BRIEF DESCRIPTION OF THE INVENTION

In accordance with this invention a process is provided for the removal of mercury present at levels of 1–5000 ppb in waste water discharged from clinical research laboratories and hospitals. The process involves preoxidation of the influent waste water with very small amounts of hypochlorite (16–100 ppm levels), in a pretreatment tank. Alternatively, hydrogen peroxide may be used as it has been found to be equally effective. The waste water is then serially filtered through two pre filters and four carbon columns at a flow rate of 5 bedvolumes/hr. The preoxidation, prefiltration, organic removal, heavy metals removal (second column) and polishing stages (third and fourth) are important to achieve very low levels of mercury in the effluent. The last three columns contain activated coconut shell carbon The three columns of the MCT impregnated carbon remove mercury and other heavy metals successively and reduce their levels in the influent to very low levels that is well below the enforced limit of 1 ppb. The last column could be also filled with MCT impregnated carbon fiber.

Each of the columns are topped by a 0.5 foot layer of 0.5% Chlorhexidine impregnated carbon. This prevents biofouling of the carbon columns. Activated carbon impregnated with butyl paraben and resorcinol monoacetate (10% on w/w basis with respect to carbon) may also be used.

These and other objects and features of the present invention will be more fully understood from the following detailed description which should be read in light of the accompanying drawings.

DETAILED DESCRIPTION OF THE INVENTION

In accordance with this invention a process and system are provided for the removal of mercury present at levels of 1–5000 ppb in waste water discharged from clinical research laboratories and hospitals.

Figure 1:
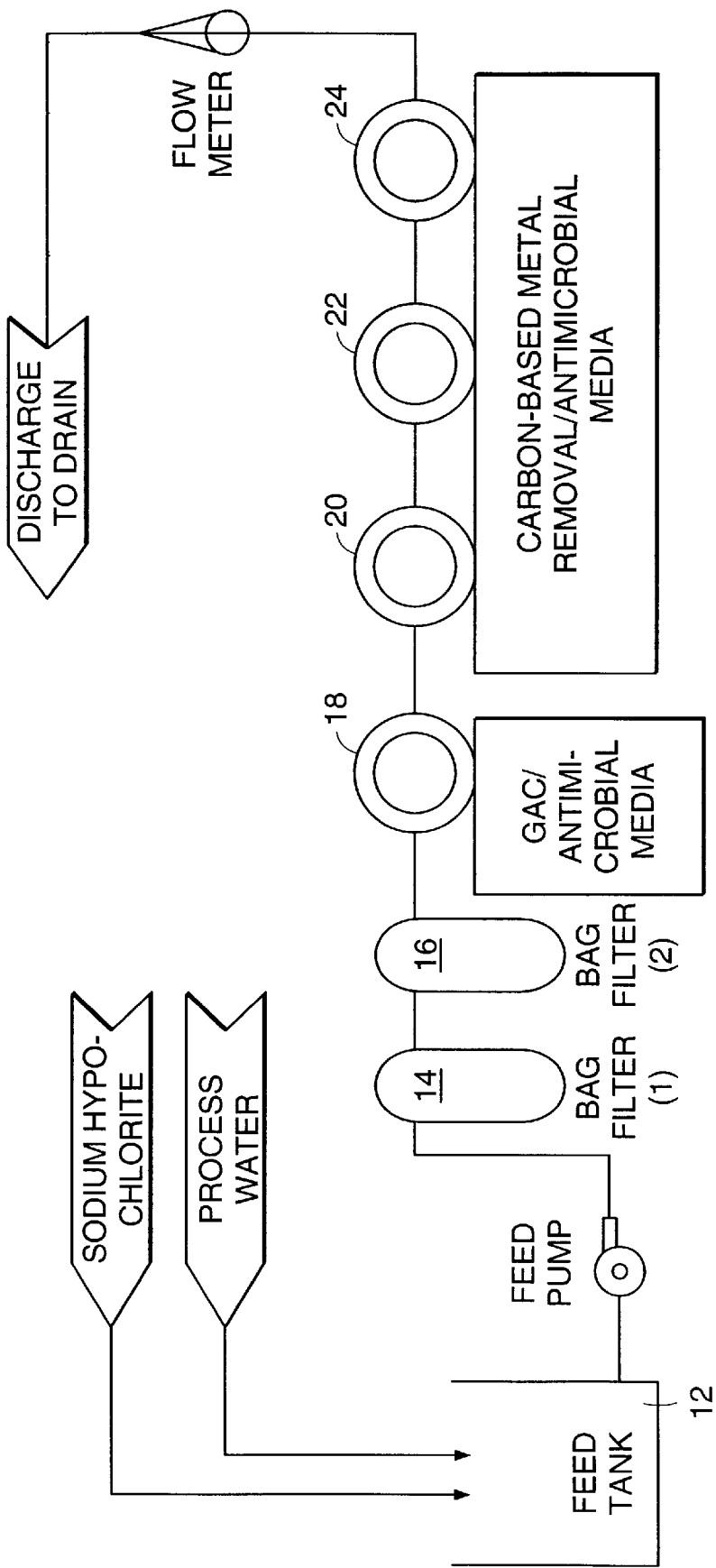
FIG. 1 is a block diagram of the components used to practice the method of the present invention.

Referring to FIG. 1, the process of the present invention involves preoxidation of the influent waste water with very small amounts of hypochlorite (16–100 ppm levels), in a pretreatment tank 12. Alternatively, hydrogen peroxide may be used as it has been found to be equally effective. The waste water is then serially filtered through two pre filters (a 20 micron polypropylene filter 14 followed by a 5 micron polypropylene filter 16) and four carbon columns 18, 20, 22, 24 at a flow rate of 5 bedvolumes/hr. The last three columns 20, 22, 24 contain activated coconut shell carbon (with a 20×50S mesh size which is sold by General Carbon Corporation, of N.J.) impregnated with 1–2% of 2-Mercaptothiazoline (MCT) which is sold by the Sigma-Aldrich Company of St. Louis, Mo. The three columns 20, 22, 24 of the MCT impregnated carbon remove mercury and other heavy metals successively and reduce their levels in the influent to very low levels that are well below the enforced limit of 1 ppb. In a preferred embodiment, the last column is filled with MCT impregnated carbon fiber (which is sold by American Kynol of New York). The preoxidation, prefiltration, organic removal, heavy metals removal (second column) and polishing stages (third and fourth) are important to achieve very low levels of mercury in the effluent. The first column 18 was a plain activated carbon column and the last three columns are MCT impregnated carbon media. This MCT impregnated carbon media has an extreme affinity for mercury as well as other heavy metals such as lead, copper, silver, nickel and cadmium Each of the columns are topped by a 0.5 foot layer of 0.5% Chlorhexidine (which is sold by the Sigma Aldrich Company of St. Louis, Mo.) impregnated carbon. This prevents biofouling of the carbon columns. Activated carbon impregnated with butyl paraben and resorcinol monoacetate (which is sold by Sigma-Aldrich, of Minnesota) 10% on w/w basis with respect to carbon was also found to be effective.

The dimensions of the skid mounted unit is preferably 52" long×32" wide×48" high. The unit is equipped with automatic shut off mechanisms and an electrical control box. Auto samplers are connected at various positions and samples are removed at the end of each day.

The mercaptothiazoline is less toxic than mercaptobenzthiazole which is also known to bind mercury. The latter is a suspected carcinogen and therefore the use of mercaptothiazoline is preferred. The mercaptothiazoline molecules become cross linked in the presence of oxidozers such as very dilute bleach. This immobilizes the MCT on the carbon.

As discussed above, the extreme complexity of the waste water and the associated microflora makes the removal of mercury a very challenging one. Synthetic membranes, ion-exchange materials etc., become easily biofouled. In addition, the presence of oxidizers such as bleach or hydrogen peroxide affects the performance of ion exchange resins. Carbon in this respect is quite sturdy, but is susceptible to biofouling. By coating the carbon surface with antimicrobials such as chlorhexidine, resorcinol monoacetate and/or butyl paraben, as taught by the present invention, a very slow release of these materials into the rest of the carbon column keeps the columns free from colonization of microorganisms. The mercaptoenzthiazoline, besides being a complexing agent for heavy metals also provides a surface that is undesirable for microorganisms to attach onto.

This process allows examination of the extreme complexity of the clinical waste waters and the trace mercury levels that fluctuate day to day. The major challenge is the biological debris and the excessive microflora in these streams that tend to foul materials such as membranes and ion exchange media. Significant reduction in the concentration of copper, lead and other trace metals will also result from the use of the process and system of the present invention. The media is also resistant to biofouling. Earlier bench scale studies showed that plain activated carbon did not have the sustained capacity for mercury nor the ability to resist biofouling. These systems can thus offer excellent performance toward achieving compliance by removing mercury and other heavy metals from waste waters.

A study at two hospitals in the Boston area showed the effectiveness of this process in achieving the desired effluent values for mercury. In addition, the biofouling of the columns was negligible in spite of the high population of microorganisms in the waste water. The MCT impregnated carbon was also bacteriostatic, thus preventing colonization on its surface. The following nonlimiting examples will further explain the disclosed invention.

EXAMPLE 1

Mercury Removal From Clinical Waste Water From a Large Private Hospital With Activated Granular Carbon Impregnated With Mercaptothiazole.

Granular activated carbon (activated coconut shell carbon was treated as follows. 24.0 gms of MCT was dissolved in 1L of 80% commercial grade Ethanol. About 1 kilogram of the dry granular activated carbon was soaked in this solution overnight. The next day excess ethanol was removed by vacuum drying at a temperature of 70–90° C.

This site typically stores all the clinical waste water in very large tanks prior to neutralization. The tanks are located at the basements of this facility and due to the presence of other equipment such as a surgical vacuum and a host of pumps and generators, the average temperature in the basement is typically 20–25° C. As a result of such favorable temperatures and the rich nutrients in the waters, a variety of microbes in alarming numbers ($10^6$cfu/ml) thrive in these waters. Since microbes accumulate mercury in a variety of forms, they form very adherent biofilms which frequently slough off causing spikes of mercury in the influent water.

The microbiological culture identification carried out during the pilot study showed the presence of the following species. *Aeromonas sobria, A. hydrophilia.veronii,* Citrobacterfreundii, *Enterobacter cancerogens, Kluyvera ascorbata,* and *Klebseilla pneumoniae.* Some of these are human pathogens that originate from the human body fluids that are analyzed in the clinical labs. Thus, the waste water is an extremely complex stream containing a host of chemicals as described above.

Figure 2A:
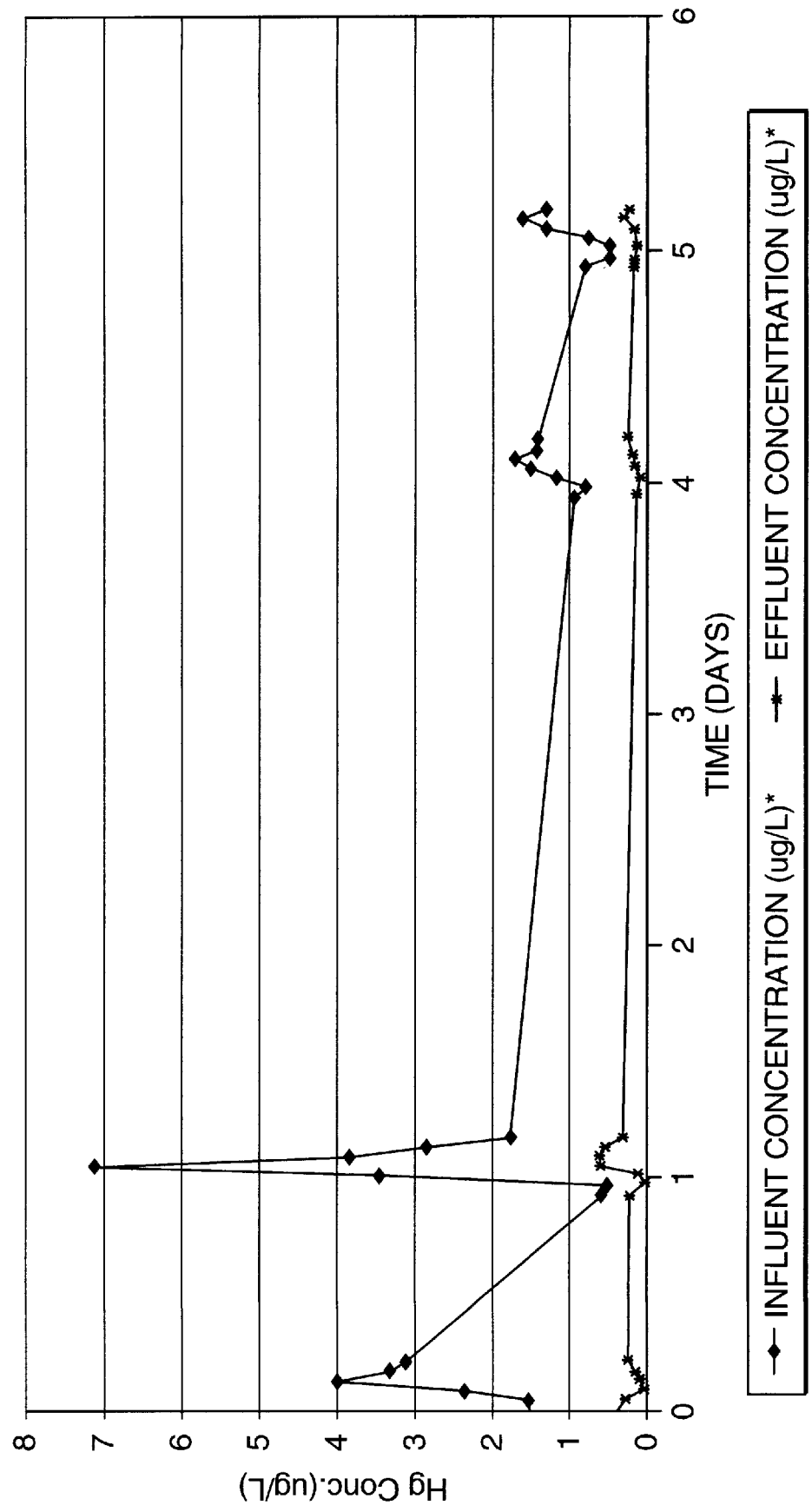
FIG. 2a is a graph showing the performance results from use of the method of the present invention during the first week.
Figure 2B:
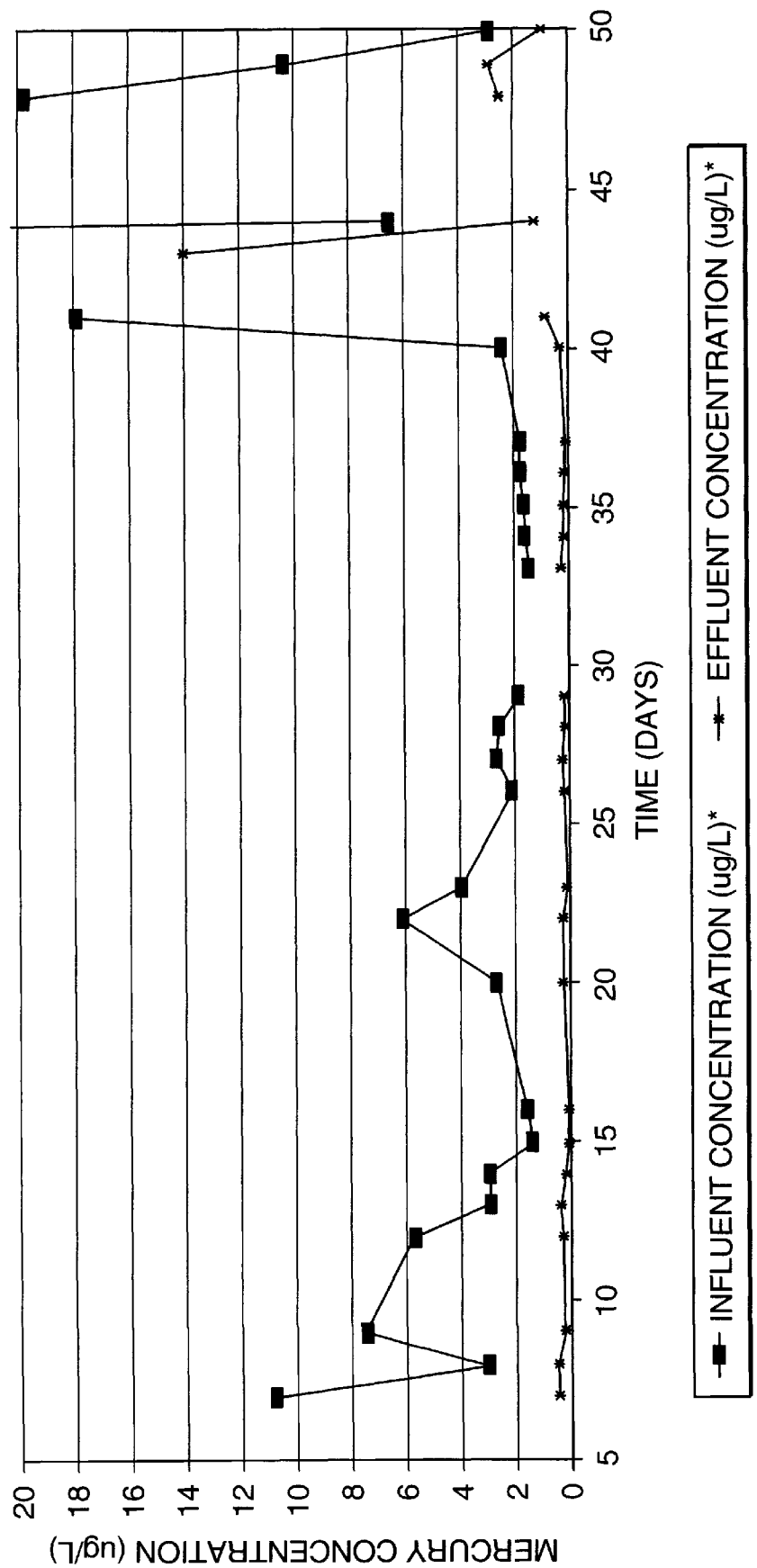
FIG. 2b is a graph showing the performance results from use of the method of the present invention during weeks 2–7.
Figure 2C:
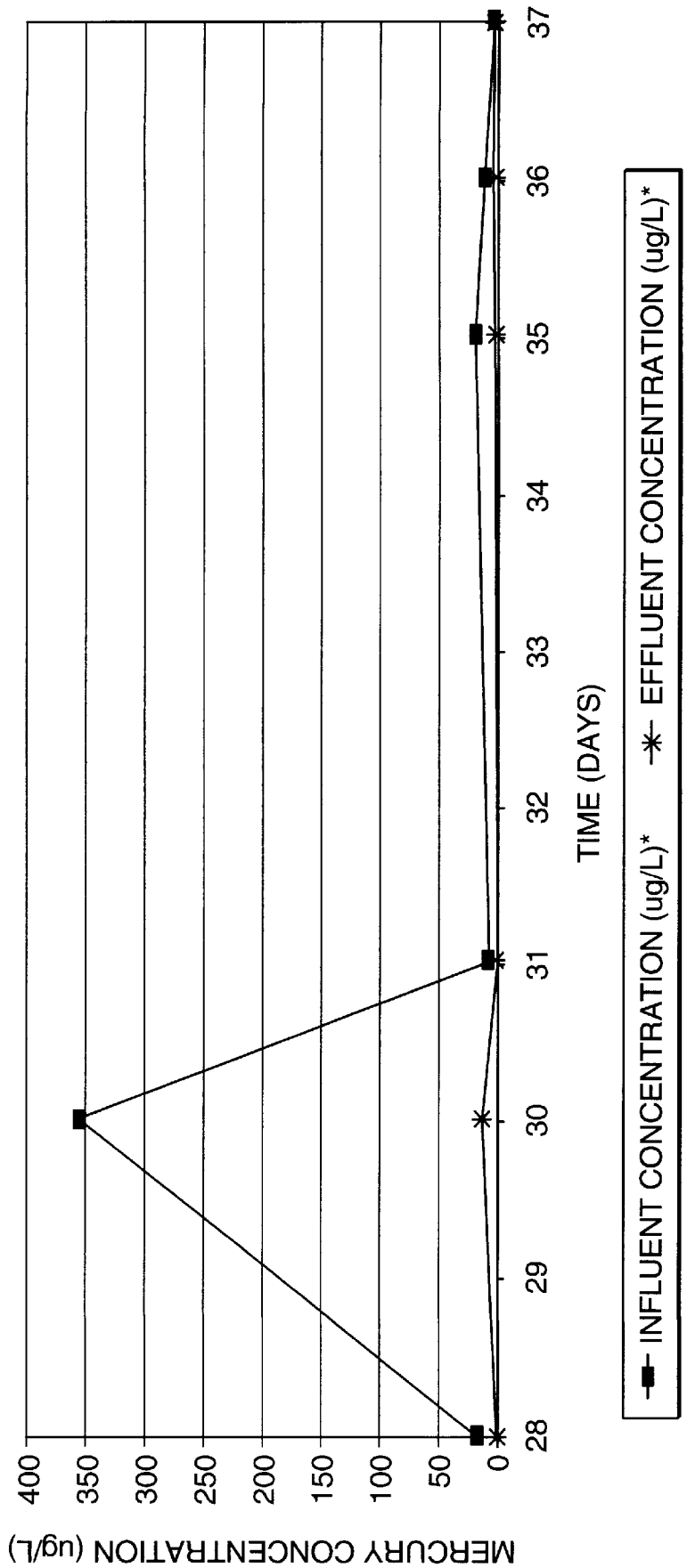
FIG. 2c is a graph showing the performance results from use of the method of the present invention during weeks 7–8.

The results of the testing of the pilot unit performance over a period of eight weeks with shutdown over the weekends are shown in FIGS. 2a through 2c. The breaks in the plot are the weekend days.

The data indicates that mercury was efficiently removed to below 1 ppb levels. It is noteworthy that when spikes occurred the system handled it quite well. One large spike that occurred with an average mercury concentration of over 300 ppb was a great concern. It was not clear how long the concentration persisted.

EXAMPLE 2

Impregnation of Activated Carbon With Resorcinol Monoacetate and Butyl Paraben.

Figure 3A:
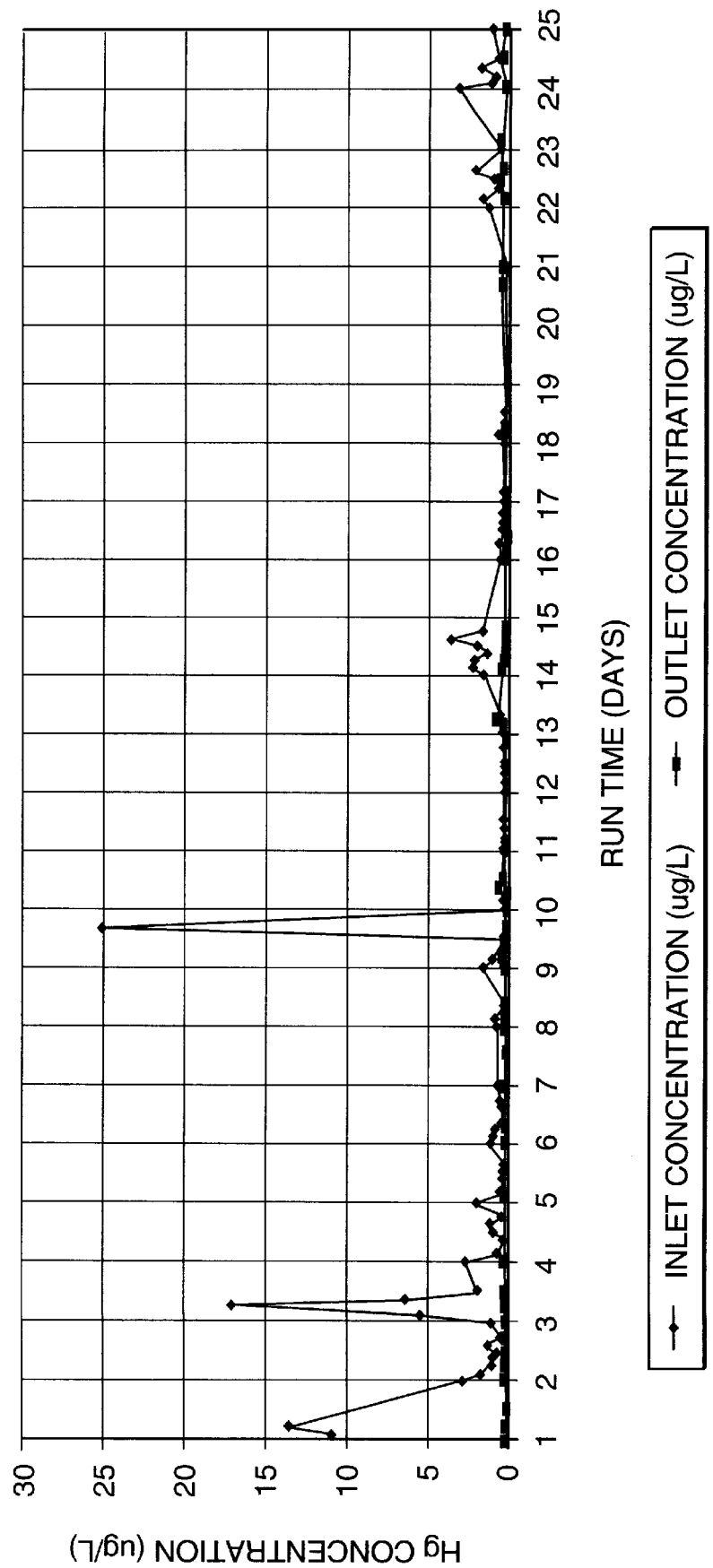
FIG. 3a and FIG. 3b are graphs showing the performance of results from use of the method of the present invention using activated carbon impregnated with resorcinol monoacetate and butyl paraben.
Figure 3B:
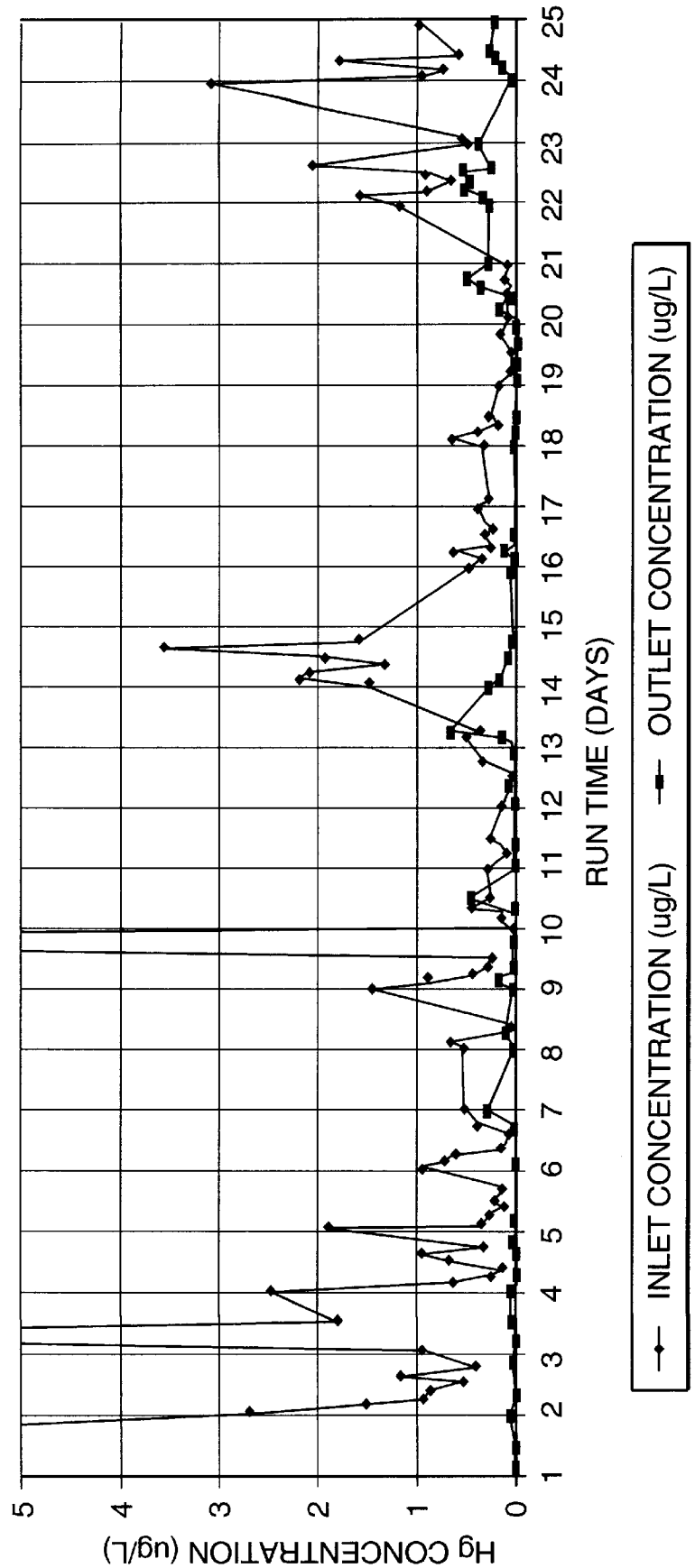

100 gms of each of resorcinol monoacetate and butyl paraben are dissolved in 1L 80% commercial grade ethanol and about 1 kilogram of the activated coconut shell granular carbon was soaked overnight in this solution. The ethanol was removed by drying at 70° C. This site is a research laboratory on human nutrition affiliated the USDA with an average waste water output of about 1000–1500 gallons/day. The waste water consists of excessive amounts of fats, proteins and the other usual chemicals as described before. The results from these tests are shown in FIGS. 3a and 3b. This facility also has a storage tank from which the waste water is discharged after pH neutralization. As to the microflora, the following species were identified: *Pseudomonas putida, Pseudomonas Xanthomonas* and three types of *Enterobacter species.* Some mold and yeast species were also present.

While the foregoing invention has been described with reference to its preferred embodiments, various alterations and modifications will occur to those skilled in the art. All such alterations and modifications are intended to fall within the scope of the appended claims.

What is claimed is:

1. A process for removing inorganic and organic mercury from clinical, medical, industrial and laboratory waste waters, said process comprising the steps of:

oxidizing the waste water with hypochlorite or hydrogen peroxide in a mixing tank;

removing mercury from the waste water by passing the waste water through filters including mercaptothiazoline impregnated carbon.

2. The process for removing inorganic and organic mercury from clinical, medical, industrial and laboratory waste water of claim 1 further comprising the step of removing solids from said waste water by passing said waste water through at least one pre filter.

3. The process for removing inorganic and organic mercury from clinical, medical, industrial and laboratory waste water of claim 1 wherein said filters include mercaptothiazoline impregnated carbon are columns.

4. The process for removing inorganic and organic mercury from clinical, medical, industrial and laboratory waste water of claim 1 wherein said carbon is coconut shell carbon.

5. The process for removing inorganic and organic mercury from clinical, medical, industrial and laboratory waste water of claim 3 wherein each of said columns are topped with a layer of chorexidine impregnated carbon.

6. The process for removing inorganic and organic mercury from clinical, medical and laboratory waste water of claim 3 wherein each of said columns is topped with a layer of resorcinol monoacetate impregnated carbon.

7. The process for removing inorganic and organic mercury from clinical, medical, industrial and laboratory waste water of claim 3 wherein each of said columns is topped with a layer of butyl paraben impregnated carbon.

8. The process for removing inorganic and organic mercury from clinical, medical and laboratory waste water of claim 1 wherein there are four filters and the second of said four filters is used primarily to remove solids from the waste water.

9. The process for removing inorganic and organic mercury from clinical, medical, industrial and laboratory waste water of claim 1 wherein there are four filters and the third and fourth of said four filters are used primarily for polishing the waste water.

* * * * *